(12) United States Patent
Chien et al.

(10) Patent No.: US 8,593,797 B2
(45) Date of Patent: Nov. 26, 2013

(54) DISPLAY DEVICE

(75) Inventors: Ming-Li Chien, Taipei (TW); Yu-Tsung Tsai, New Taipei (TW); Chang-Ying Sung, Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 155 days.

(21) Appl. No.: 13/367,386

(22) Filed: Feb. 7, 2012

(65) Prior Publication Data
US 2013/0083458 A1    Apr. 4, 2013

(30) Foreign Application Priority Data
Oct. 3, 2011   (TW) .............................. 100135778 A

(51) Int. Cl.
*G06F 1/16* (2006.01)
(52) U.S. Cl.
USPC .... 361/679.21; 345/179; 720/654; 369/13.02
(58) Field of Classification Search
USPC ......... 345/158, 161, 619, 156, 179, 661, 419, 345/173; 720/728, 614, 738, 645, 654; 369/44.15, 215.1, 126, 30.17, 13.02, 369/44.34; 361/679.01, 679.23, 679.09, 361/679.15, 679.3, 679.04, 679.26, 679.56, 361/679.41, 679.43, 679.27, 679.55
See application file for complete search history.

(56) References Cited

U.S. PATENT DOCUMENTS 5,894,469 A * 4/1999 Usami et al. .................. 720/634
2004/0012468 A1* 1/2004 Hyp ................................. 335/9

* cited by examiner

*Primary Examiner* — Hung Duong
(74) *Attorney, Agent, or Firm* — Rabin & Berdo, P.C.

(57) ABSTRACT

A display device includes a display portion, a cantilever, a rotating disc unit, a base, and two cables. The cantilever has an upper end connected with the display portion, allowing the display portion to rotate relative to the cantilever about a first axis. The rotating disc unit is connected with a bottom of the cantilever, allowing the cantilever to pivot relative to the rotating disc unit about a second axis, which is parallel with the first axis. The base is connected to the rotating disc unit in a manner allowing the same to rotate relative to the base about a third axis, which is vertical to the first and second axes. The cables extend downward from the display portion along the cantilever and are inserted into the rotating disc unit. The cables enter the base after being placed adjacent to one another within the rotating disc unit.

10 Claims, 5 Drawing Sheets

DISPLAY DEVICE

RELATED APPLICATIONS

This application claims priority to Taiwan Application Serial Number 100135778, filed Oct. 3, 2011, which is herein incorporated by reference.

BACKGROUND

1. Field of Invention

The present invention relates to a display device.

2. Description of Related Art

The display device is a necessary product in today's world. In order to save room and improve picture quality, liquid crystal display (LCD) (and other flat panel display) monitors are replacing cathode ray tube (CRT) monitors. Changing the rotating angle of the display portion of an LCD monitor to adjust the viewing angle can provide more viewing convenience for the user.

In a typical display device, a display portion is disposed on a cantilever, and hinges are provided between the display portion and cantilever and connected to the same. However, the loading ability of the hinges needs to be improved because of the heavy weight of the display portion. Furthermore, the rotating of the hinges may cause the cables to stretch and even break due to the manner of connection of the cables.

Therefore, there is a need to develop a display device that is capable of avoiding the foregoing disadvantages.

SUMMARY

It is therefore an objective of the present invention to provide a display device.

In accordance with the foregoing and other objectives of the present invention, a display device includes a display portion, a cantilever, a rotating disc unit, a base, and a pair of cables. The cantilever has an upper end connected with the display portion such that the display portion is capable of rotating relative to the cantilever about a first axis. The rotating disc unit has an upper end connected with a bottom of the cantilever such that the cantilever is capable of rotating relative to the rotating disc unit about a second axis. The second axis is parallel with the first axis. The base is connected with a bottom of the rotating disc unit such that the rotating disc unit is capable of rotating relative to the base about a third axis. The third axis is vertical to the first axis to and the second axis. The cables extend downward from the display portion and are disposed along two opposite sides of the cantilever and inserted into the rotating disc unit. The cables enter into the base after being placed adjacent to one another within the rotating disc unit.

According to another embodiment disclosed herein, the display device further includes an outer housing, which is used to cover the cantilever and the rotating disc unit.

According to another embodiment disclosed herein, the display device further includes a junction board connected with the display portion and the cantilever.

According to another embodiment disclosed herein, the cables extend downward from the junction board and are disposed along the two opposite sides of the cantilever.

According to another embodiment disclosed herein, the cantilever is made from one or more metal materials.

According to another embodiment disclosed herein, the display device further includes an axle rod by which the rotating disc unit is pivotally connected with the cantilever.

According to another embodiment disclosed herein, an elastic sleeve is disposed in a cavity of a joint by which the cantilever is pivotally connected with the rotating disc unit and is wrapped around the axle rod.

According to another embodiment disclosed herein, the elastic sleeve is a torsion spring.

According to another embodiment disclosed herein, each of two opposite sides of the rotating disc unit has an opening, and the cables are inserted into the rotating disc unit through the openings of the rotating disc unit and are extended toward and placed adjacent to one another.

According to another embodiment disclosed herein, the rotating disc unit has a central hole at the bottom side thereof and the cables are inserted through the central hole and extended into the base.

Thus, the display device herein not only provides convenience for users in adjusting the display portion but also prevents damage to the cables resulting from twisting of the same.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides a display device that provides an enhanced configuration for the placement of cables to thereby reduce cable displacement and maintain the length of the cables during rotation of a display portion of the display device, ultimately preventing damage and breakage of the cables.

Figure 1:
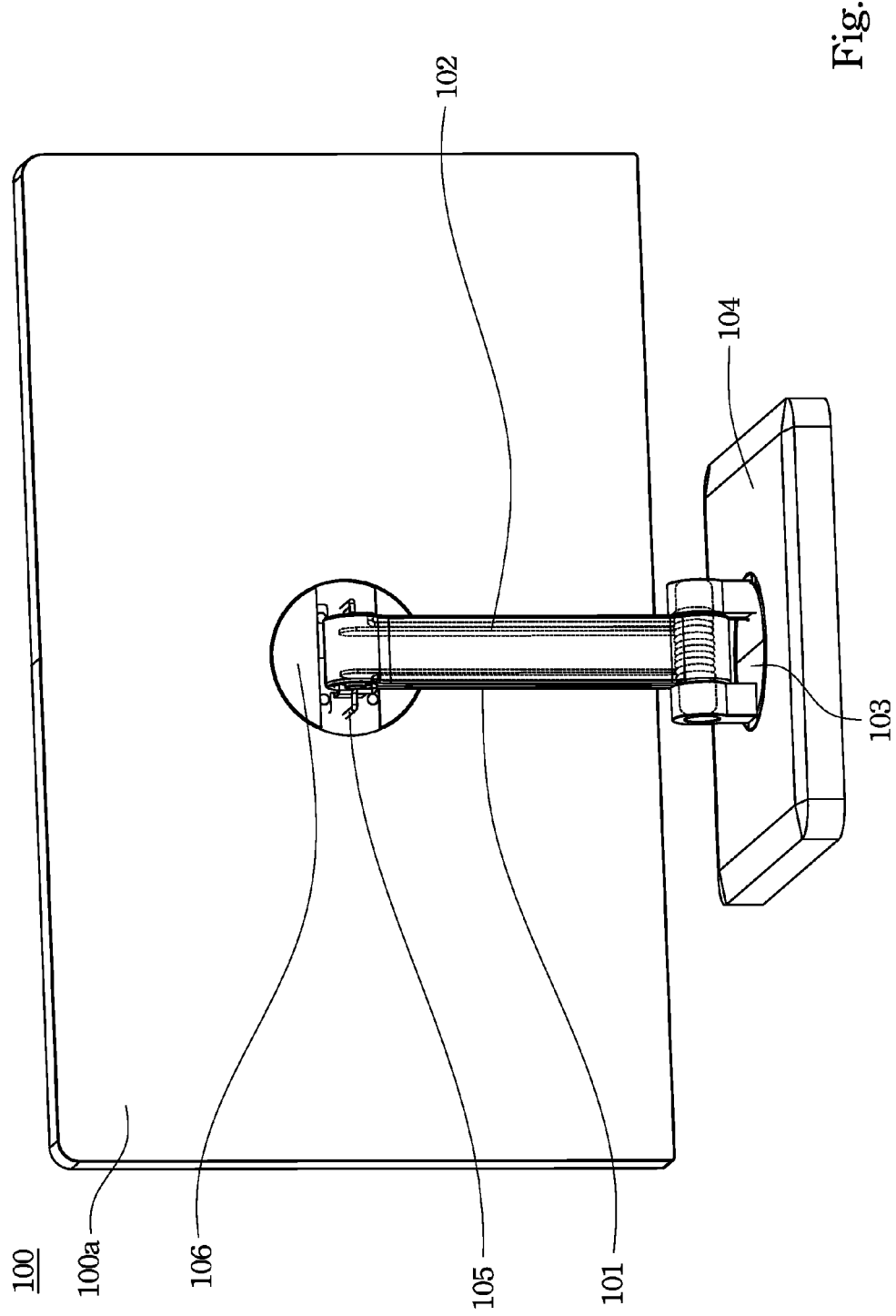
FIG. 1 illustrates a rear view of a display device according to an embodiment of the present invention.

FIG. 1 shows a rear view of a display device 100 according to an embodiment of the present invention. The display device 100 includes a display portion 100a, an outer housing 101, a cantilever 102, a rotating disc unit 103, a base 104, and a pair of cables 105. A junction board 106 is connected with the display portion 100a. The cantilever 102 and rotating disc unit 103 are covered by the outer housing 101. The outer housing 101 reduces the effect of any external force applied to the display device 100 and prevents dust from entering into the cantilever 102 and the rotating disc unit 103. In the embodiment, the cantilever 102 is made from one or more metal materials.

Figure 2:
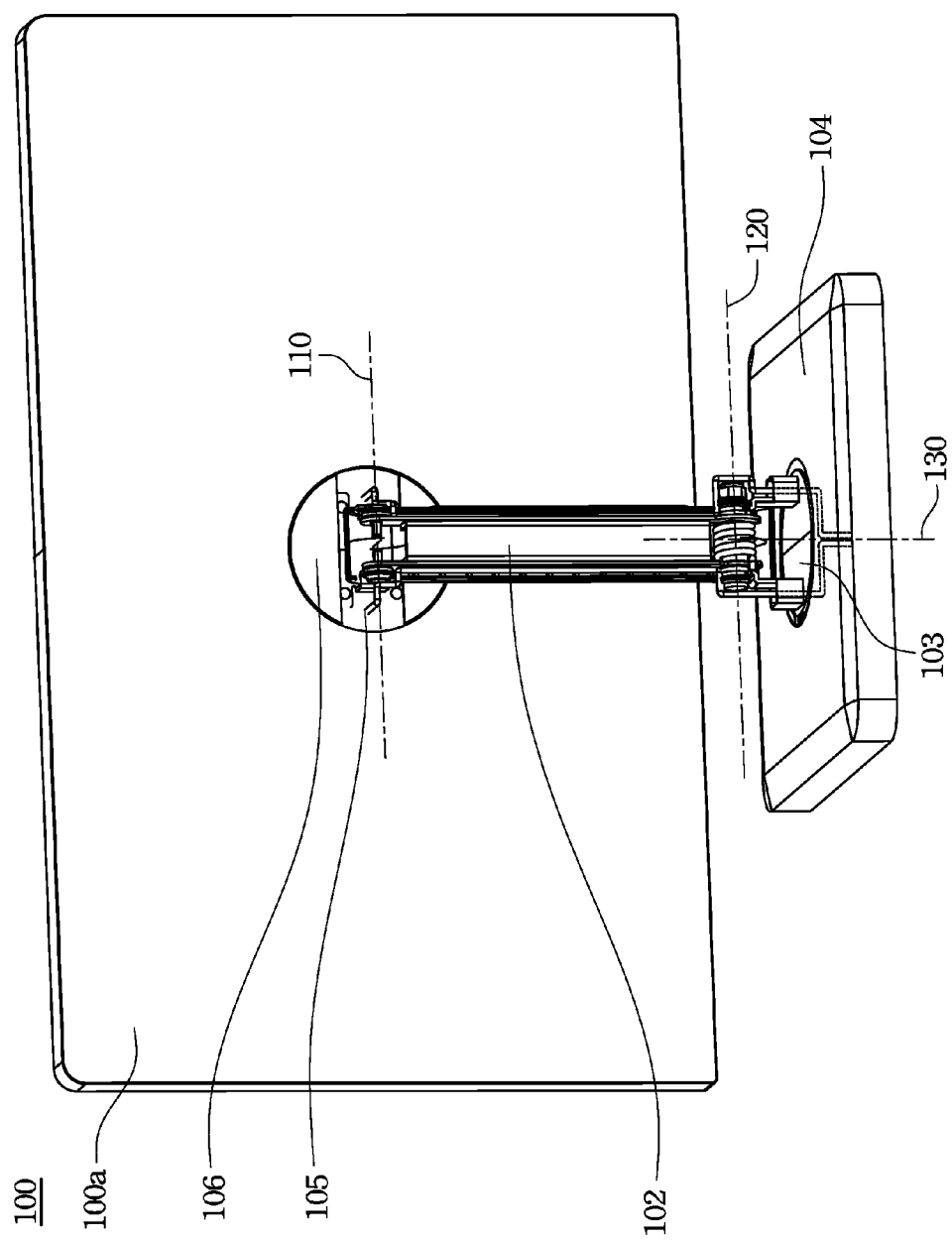
FIG. 2 illustrates a rear view of the display device of FIG. 1 with an outer housing removed.

FIG. 2 shows a rear view of the display device 100 of FIG. 1 with the outer housing 101 removed. Referring to FIG. 1 and FIG. 2, the cantilever 102 has an upper end connected with the display portion 100a such that the display portion 100a is capable of rotating relative to the cantilever 102 about a first axis 110. The rotating disc unit 103 has an upper end connected with a bottom of the cantilever 102 such that the cantilever 102 is capable of rotating relative to the rotating disc unit 103 about a second axis 120. The second axis 120 is parallel with the first axis 110. The base 104 is connected with a bottom of the rotating disc unit 103 such that the rotating disc unit 103 is capable of rotating relative to the base 104 about a third axis 130. The third to axis 130 is vertical to the first axis 110 and the second axis 120. The cables 105 extend downward from the display portion 100a and are disposed along the two opposite sides of the cantilever 102 and inserted into the rotating disc unit 103. The cables 105 enter into the base 104 after extending to meet each other in the rotating disc unit 103 (e.g., the cables are placed adjacent to one another and extended downwardly into the base 104). The display portion 100a rotates on the cantilever 102 about the first axis 110. The cantilever 102 pivots on the rotating disc unit 103 about the second axis 120. The rotating disc unit 103 rotates relative to the base 104 about the third axis 130. Therefore, the user can adjust the position of the display portion 100a in many ways, including adjusting the distance between the user and the display portion 100a.

Figure 3:
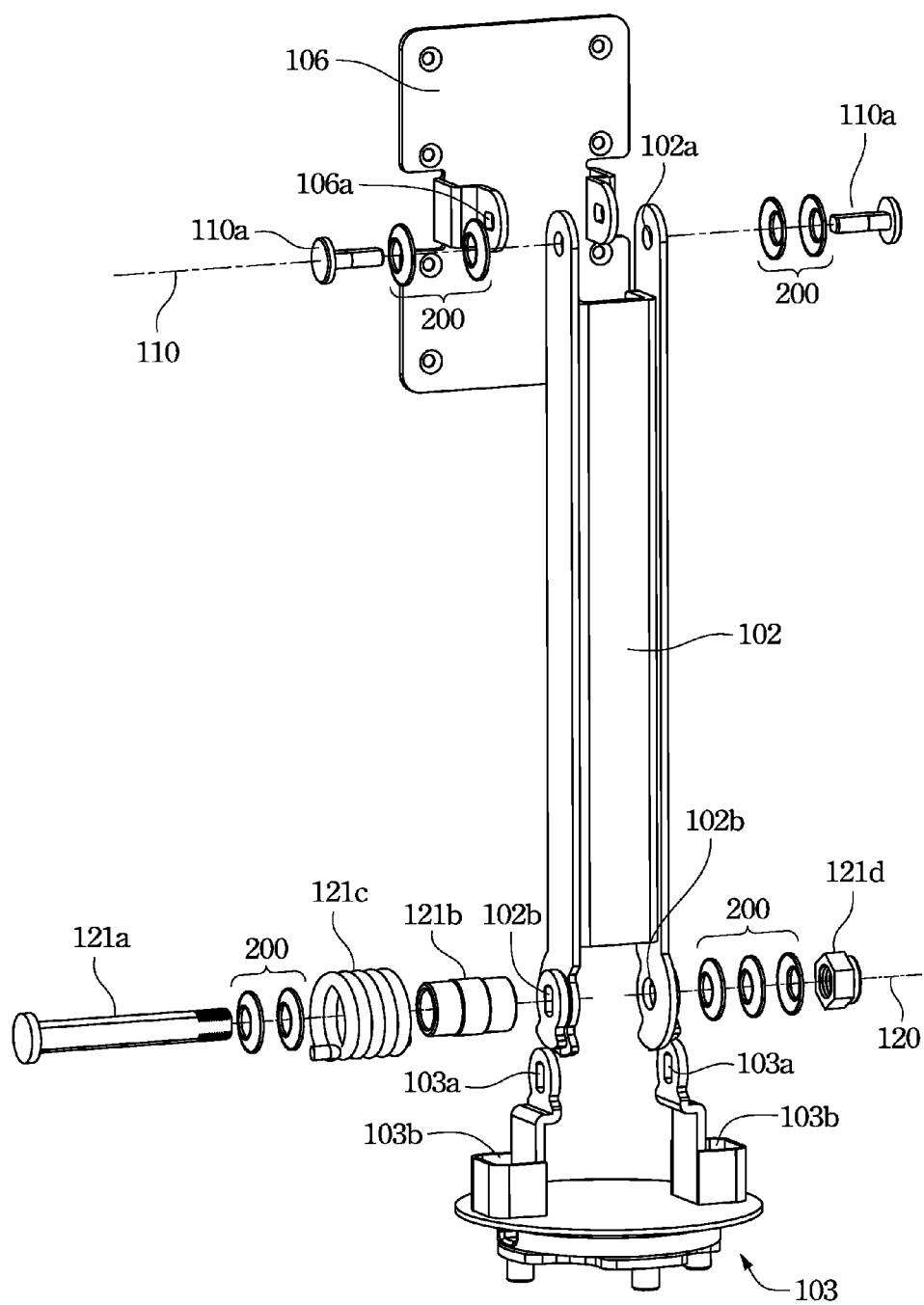
FIG. 3 illustrates an exploded view of a cantilever of the display device of FIG. 1.

FIG. 3 shows an exploded view of the cantilever 102 of the display device 100 of FIG. 1. After a screw 110a with pads 200 is inserted through upper holes 102a of the cantilever 102 and holes 106a of the junction board 106, the screw 110a is tightened such that the cantilever 102 is connected with the junction board 106. When the junction board 106 is connected with the display portion 100a (as shown in FIG. 2), the display portion 100a can be adjusted about the first axis 110. An axle rod 121a with pads 200 is inserted through lower holes 102b of the cantilever 102 and holes 103a of the rotating disc unit 103. The axle rod 121 is covered with a sleeve 121b and an elastic sleeve (hereinafter referred to as "a torsion spring") 121c is disposed between the lower holes 102b of the cantilever 102. That is, a portion of the cantilever 102 forming a joint by which the cantilever 102 is pivotally connected with the rotating disc unit 103 defines a cavity between the lower holes 102b of the cantilever 102, and the torsion spring 121c is disposed in the cavity. After the axle rod 121a is inserted through the lower holes 102b of the cantilever 102 and through the holes 103a of the rotating disc unit 103, the axle rod 121a is tightened using a nut 121d and the pads 200 such that the cantilever 102 is connected with the rotating disc unit 103. Therefore, the cantilever 102 is able to rotate about the second axis 120. The elastic restoring force of the torsion spring 121c can counteract the weight of the display portion 100a and cantilever 102 such that the user can conveniently pivot the cantilever 102 about the second axis 120.

Figure 4A:
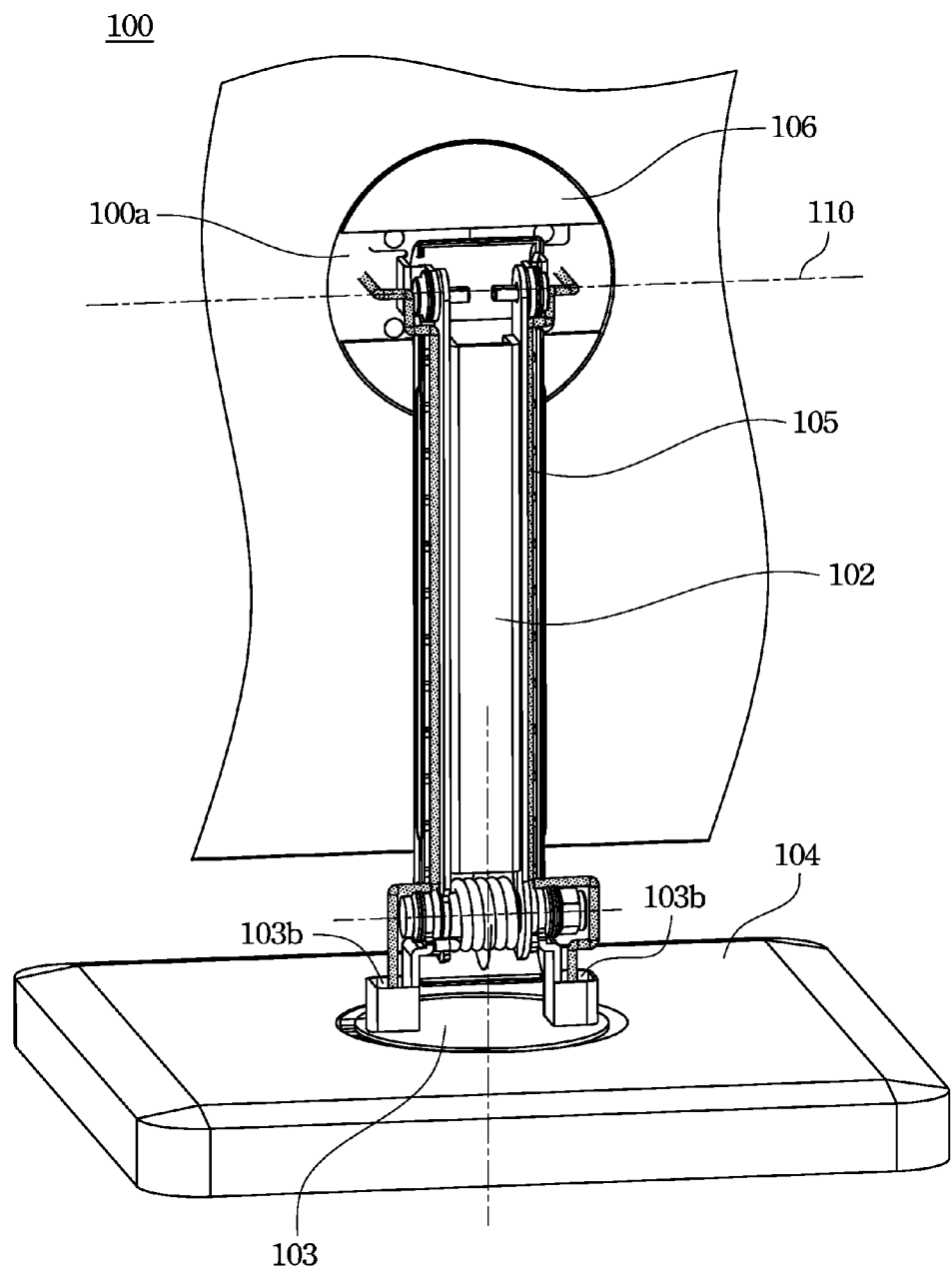
FIG. 4A illustrates a cable layout of the display device of FIG. 1 from a display portion to a rotating disc unit.

FIG. 4A shows a cable layout of the display device 100 of FIG. 1 from the display portion 100a to the rotating disc unit 103. When the display portion 100a is connected with the junction board 106, the cables 105 are inserted through the display portion 100a close to opposite sides of the junction board 106 near the first axis 110 and extend downward along the cantilever 102 from the position where the junction board 106 is connected with the cantilever 102. The cables 105 enter into the rotating disc unit 103 from two opposite openings 103b of the rotating disc unit 103.

Figure 4B:
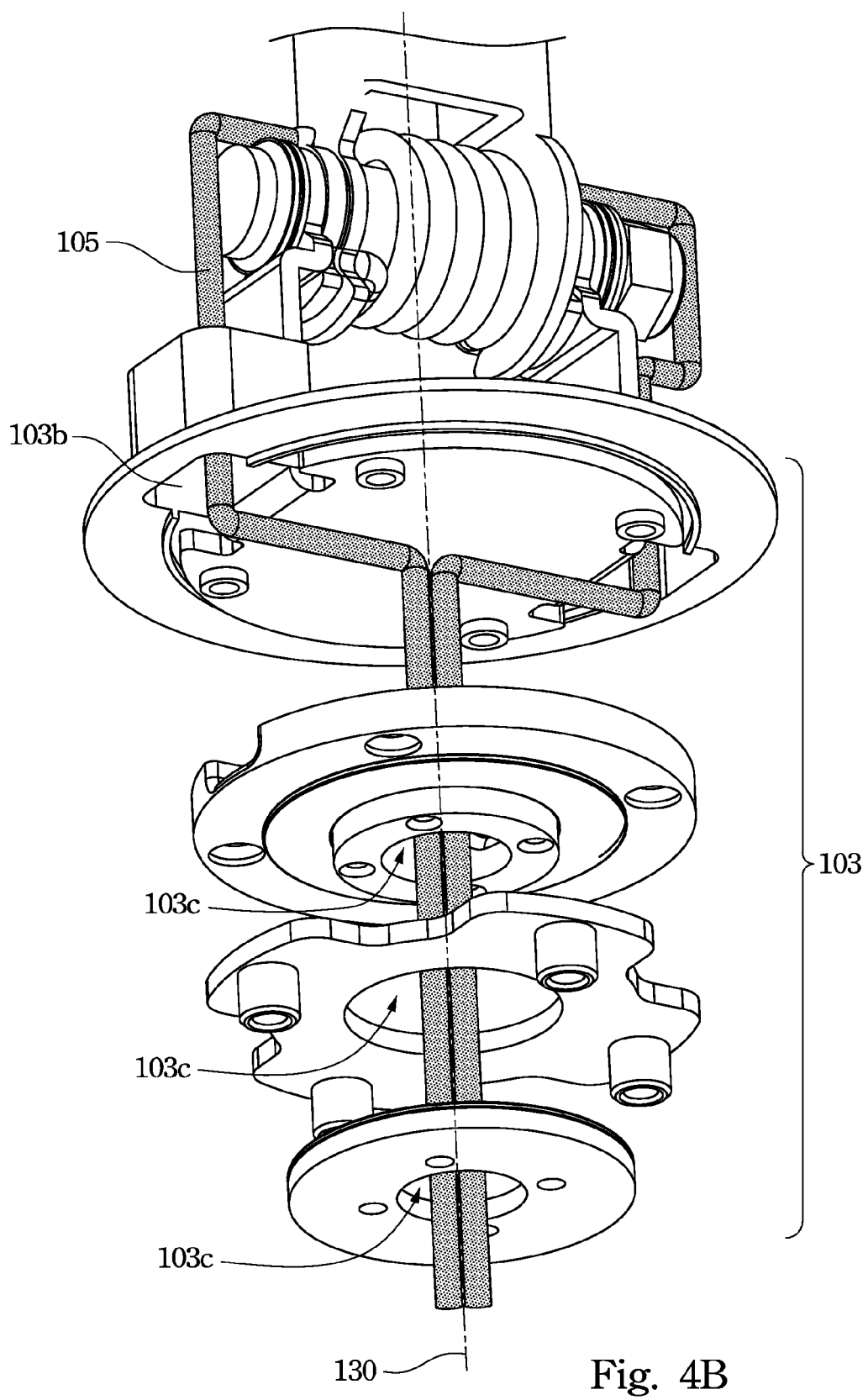
FIG. 4B illustrates a cable layout of the display device of FIG. 1 from the rotating disc unit to a base.

FIG. 4B shows a cable 105 layout of the display device 100 of FIG. 1 from the rotating disc unit 103 to the base 104. The cables 105 enter into and extend through the rotating disc unit 103 through the openings 103b formed in the rotating disc unit 103. A cavity in the rotating disc unit 103 is used for extending the cables 105 toward each other so that the cables 105 can be placed adjacent to one another. After the cables 105 are placed adjacent to one another, the cables 105 enter into the base 104 (as shown in FIG. 2) through a central hole 103c located in the rotating disc unit 103. The cables 105 extend adjacent to one another in the rotating disc unit 103 such that the cables 105 do not undergo too much displacement change when the rotating disc unit 103 rotates.

According to the embodiments described above, the display device of the present invention not only provides a counterbalancing force to the weight of the display portion to allow for easy adjustment of the display device, but also minimizes cable displacement such that damage and breakage to the cables can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device comprising:
    a display portion;
    a cantilever having an upper end connected with the display portion such that the display portion is capable of rotating relative to the cantilever about a first axis;
    a rotating disc unit having an upper end connected with a bottom of the cantilever such that the cantilever is capable of rotating relative to the rotating disc unit about a second axis, wherein the second axis is parallel with the first axis;
    a base connected with a bottom of the rotating disc unit such that the rotating disc unit is capable of rotating relative to the base about a third axis, wherein the third axis is vertical to the first axis and the second axis; and
    a pair of cables extending downward from the display portion and being disposed along two opposite sides of the cantilever and inserted into the rotating disc unit, the cables entering into the base after being placed adjacent to one another within the rotating disc unit.

2. The display device of claim 1, further comprising an outer housing covering the cantilever and the rotating disc unit.

3. The display device of claim 1, further comprising a junction board connected with the display portion and the cantilever.

4. The display device of claim 3, wherein the cables extend downward from the junction board and are disposed along the two opposite sides of the cantilever.

5. The display device of claim 3, wherein the cantilever comprises one or more metal materials.

6. The display device of claim 1, further comprising an axle rod by which the rotating disc unit is pivotally connected with the cantilever.

7. The display device of claim 6, wherein an elastic sleeve is disposed in a cavity of a joint by which the cantilever is pivotally connected with the rotating disc unit and is wrapped around the axle rod.

8. The display device of claim 7, wherein the elastic sleeve is a torsion spring.

9. The display device of claim 1, wherein each of two opposite sides of the rotating disc unit has an opening, and the cables are inserted into the rotating disc unit respectively through the openings of the rotating disc unit and are extended toward and placed adjacent to one another.

10. The display device of claim 1, wherein the rotating disc unit has a central hole at a bottom side thereof and the cables are inserted through the central hole and extended into the base.

* * * * *